United States Patent
Chang et al.

[11] Patent Number: 5,808,207
[45] Date of Patent: Sep. 15, 1998

[54] MICROBALLOON IMPREGNATED FIBER REINFORCED RTV FILM COMPRESSION STRESS SENSOR TESTING METHOD

[75] Inventors: Dick J. Chang, Los Angeles; James P. Nokes; Francis Hai, both of Torrance, all of Calif.

[73] Assignee: The Aerospace Corporation, El Segundo, Calif.

[21] Appl. No.: 885,475
[22] Filed: Jun. 30, 1997
[51] Int. Cl.⁶ .................................................. G01N 3/08
[52] U.S. Cl. ................................. 73/819; 73/768
[58] Field of Search .............. 73/768, 801, 818, 73/819

[56] References Cited

U.S. PATENT DOCUMENTS

| | | | |
|---|---|---|---|
| 3,712,221 | 1/1973 | Voigt, Jr. et al. | 102/24 |
| 4,077,253 | 3/1978 | Grisell | 73/606 |
| 4,932,264 | 6/1990 | Hawkins et al. | 73/762 |
| 5,251,414 | 10/1993 | Duke | 52/309 |
| 5,675,089 | 10/1997 | Hawkins | 73/801 |

*Primary Examiner*—Max H Noori
*Attorney, Agent, or Firm*—Derrick Michael Reid

[57] ABSTRACT

A thin film stress sensor measures the maximum compressive stress between two elements that are compressed together. The sensor is formed from a thin RTV film impregnated with microballoons and reinforced with carbon fibers to restrain the lateral deformation of the RTV so that more uniform pressure can be exerted on the microballoons when the sensors are uniaxially compressed. The testing method includes applying a compressive stress up to an maximum compressive stress to rupture a first portion of the microballoons, and then applying an interrogating pressure causing acoustic emissions emitted by a second portion of the microballoons when the interrogating pressure equals the equivalent maximum compressive stress, so as to determine the maximum compressive stress.

6 Claims, 4 Drawing Sheets

RTV Film Cell

Reinforced Fiber RTV Film

RTV Film Cell

AE Signal Acquisition System

MICROBALLOON IMPREGNATED FIBER REINFORCED RTV FILM COMPRESSION STRESS SENSOR TESTING METHOD

STATEMENT OF GOVERNMENT INTEREST

The invention was made with Government support under Contract No. F04701-93-C-0094 by the Department of the Air Force. The Government has certain rights in the invention. The invention described herein may be manufactured and used by and for the government of the United States for governmental purpose without payment of royalty therefor.

REFERENCE TO RELATED APPLICATION

The present application is related to applicant's co-pending application entitled Microballoon Impregnated Fiber Reinforced RTV Film Compression Stress Sensor, Ser. No. 08/884,782 filed 6/30/97, by the same inventors.

FIELD OF THE INVENTION

The invention relates to the field of stress measurement and devices. More particularly, the present invention relates to the acoustic emission of microballoons in compressive stress sensors for determining the level of applied compression stress.

BACKGROUND OF THE INVENTION

The measurement of interface compression between two adjacent elements is an important consideration in mechanical systems. The interface compression can be generated many different ways. The interface compression can be mechanically or thermo-mechanically induced. A typical example of mechanically generated compression is the stress induced by window mounting in which mounting gaskets are compressed against the window material by the action of screw tightening. In components experiencing high temperature, high compressive stress is generated depending upon the differences in the thermal expansion coefficients (CTE) and the constraints of the materials. The material of higher CTE will be in compression. In the first case, only magnitudes of the torque applied to the screws are normally specified. The resulting compression force in each mounting screw could vary significantly because the fraction of the applied torque energy going to the screw depends on the magnitude of friction between the two material surfaces. In both cases, unless the moduli and the CTE of the materials, as well as the coefficient of friction between two contacting surfaces are known, the magnitudes of the interface compression are difficult to determine accurately. Ideally, a stress sensor could be used to measure interface compression. To accurately measure the interface compression, the stress sensor should be thin and flexible so that it does not disturb the local stress field.

Hollow glass microballoons have been used as embedded pressure sensors to record the maximum pressure attained in a fluid. This technique is based on the observation that microballoons with an extensive size distribution exhibit a wide rupture strength distribution. The weaker balloons break first at lower pressures, while the stronger balloons survive to higher pressures. Microballoons are tiny, hollow, thin-walled, glass spherical shells in various sizes. Microballoon diameters vary considerably, for example from one to one hundred and sixty microns for 3M C15/250 microballoons. They are commercially available in bulk for use as low cost, lightweight filler. As the microballoons break, they generate acoustic emission (AE) that can be readily monitored using standard AE instrumentation. The distribution of rupture strengths can be used to measure the maximum attained pressure in a system by utilizing the Kaiser effect. The Kaiser effect states that during a subsequent pressurization of the microballoons after the initial pressurization, no AE will be generated until the hydrostatic pressure becomes greater than the initially applied unknown pressure, thereby indicating magnitude of the initially applied unknown pressure. In a typical experimental procedure, a sample of the microballoons is exposed to an unknown pressure. The exposed sample is then placed in a pressure chamber and monitored for AE activity as the hydrostatic pressure is increased. The pressure at which the AE activity begins is a measure of the maximum pressure previously applied to the sample. A histogram graphically represents the number of AE events from a sample of microballoons versus the exposed hydrostatic pressure.

Hollow glass microballoons mixed with grease have been successfully used as embedded pressure sensors to record the maximum pressure attained in a fluid. The microballoon rupture technique has been used successfully to determine the maximum pressure in locations difficult to sense. Measurements have been made of the pressure exerted on the clevis joint by trapped O-ring grease during a solid rocket motor stacking operation. The same measurement method was also used to record the maximum over pressure levels experienced at various locations of a rocket launch pad. In both cases, 3M C15/250 microballoons were mixed with Dow Corning Molykote 55 grease. The burst pressures of the microballoons chosen for these applications covered a range of fifty to more than fourteen hundred psi. The measurement resolution for maximum pressures of approximately one hundred psi was better than five psi. The microballoon technique has also been used with the microballoons mixed with grease as disclosed in U.S. Pat. No 4,932,264.

Various gaskets are used to interface between one element and another that are compressed together. For example, during the assembly of a high performance window, it is desirable to measure the interface compression stress between the window and the mounting gasket. The resulting force in each mounting screw could vary significantly because only the magnitude of the applied torque to each mounting screw is typically specified, and because the fraction of the applied torque energy going to the screw depends on the magnitude of the friction. This is why the determination of the actual compression force on a gasket translated from the torque applied to the screws is difficult. Since microballoon-filled sensors could be both small and flexible, microballoons use would seem desirable. The microballoon grease technique has disadvantageously been limited to measure the compression field in an hydrostatic fluid medium. This and other disadvantages are solved or reduced using the invention.

SUMMARY OF THE INVENTION

An object of the invention is to provide a fabrication process of a film which can measure compressive stress.

Another object of the invention is to provide a fabrication process of a microballoon impregnated film.

Yet another object of the invention is to provide a fabrication process of a fiber restrained microballoon impregnated film indicating the level of applied compression stress.

Still another object of the invention is to provide a method for determining the compressive stress applied to a film.

A further object of the invention is to provide a fabrication process of a gasket which can be used to determine applied compressive stress in a fastening system generated by an applied torque.

A compressive stress film sensor comprises a microballoon impregnated film reinforced with fibers. The fibers confine the microballoons within cells defined by the fibers. The rupturing action of the microballoons emit acoustic emissions when stress is initially applied, and upon a subsequent application of pressure, the acoustic emissions are emitted again when the subsequently applied pressure exceeds the equivalent pressure of the initially applied stress. The film sensor can be used to determine the initial applied stress level from monitoring the level of the subsequently applied pressure. A combination of thin RTV film impregnated with 3M C15/250 microballoons and reinforcing carbon filaments forms a composite matrix film. The preferred film is made of GE-RTV-11 with two parts silicone. Typically, one to two weight percent ratio of microballoons to RTV is mixed together. The mixture of microballoons in RTV-11 can be cured at room temperature. Carbon fibers are added to restrain the lateral deformation of the RTV so that more uniform pressure can be exerted on the microballoons when the film is uniaxially compressed.

The sensor is a very thin and flexible film. When the thin film stress sensor is inserted between the two adjacent elements, the sensor can be used to determine the compression developed either mechanically or thermo-mechanically as an initially applied pressure. The compression will cause certain microballoons to break. The amounts of the microballoon breakage depends upon the magnitude of the compression load, type of microballoons, film material and fibers used. The function of the reinforcing fibers, such as carbon filaments in the film, is to provide lateral constraint to the RTV matrix material. The inserted thin film stress sensor, after the initially applied pressure creating an initial amount of microballoon breakage, can be inserted into a pressure chamber for application of a subsequently applied test pressure for AE signal interrogation to determine the amount of the initially applied compression stress. The AE signal initiation begins when the subsequently applied interrogation gas pressure reaches the equivalent level of the initially applied compression stress. This subsequently applied interrogation pressure is increased and recorded at the point of initiation of an AE signal. The recorded pressure is compared with calibrated test pressures to determine a value of the initially applied pressure or to determine the amount of initial compression stress. The calibration ratio between the interrogation gas pressure and the uniaxially applied compressive stress can be experimentally determined.

The fabrication of a compression thin film stress sensor uses three components, microballoons, incompressible RTV, and reinforcing fibers. The sensor effectively records the magnitude of the highest level of compression stress. The RTV matrix holds the microballoons in a thin film form and provides sensor flexibility. The reinforcing carbon filaments provide lateral constraint to the microballoons in the RTV and provide more uniform pressure distribution around the microballoons when under compression load. The microballoons will buckle in a brittle manner under the induced pressure distribution. The magnitude of the compression can be determined from the results of the AE interrogation. These and other advantages will become more apparent from the following detailed description of the preferred embodiment.

DETAILED DESCRIPTION OF THE PREFERRED EMBODIMENT

Figure 1:
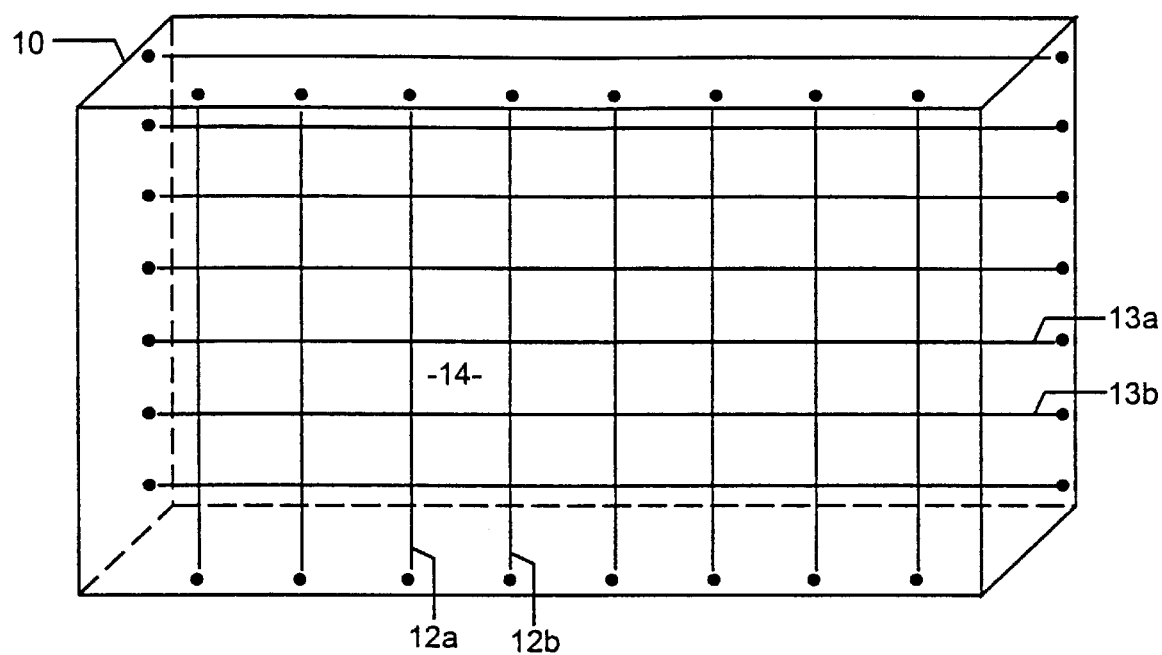
FIG. 1 depicts a fiber reinforced RTV film having a plurality of cells.

An embodiment of the invention is described with reference to the figures using reference designations as shown in the figures. Referring to FIG. 1, the film sensor 10 includes a deformable incompressible material into which can be uniformly impregnated an AE producing material reinforced with fibers to constrain the lateral movement of the deformable incompressible material. The preferred AE producing material is composed of small microballoons such as 3M C15/250 microballoons. The preferred film is made of GE-RTV-11 with two parts silicone. The preferred fiber is a matrix of cross-ply T300 fibers 12 and 13. The thickness of the cured RTV sheet may vary considerable, but should be thin, for example, 0.13 mm. Fibers 12 extend in parallel to each other in a top plain of film 10. Fibers 13 extend in parallel to each other in a bottom plain, and extend orthogonal to fibers 12. The fibers 12 and 13 are shown as parallel, orthogonal, and form two plains but other fiber arrangements, such as a weave, can be used as well. The cross-ply fibers 12 and 13 form a checker board matrix of cells, one of which is designated as cell 14 defined by fibers 12a and 12b and 13a and 13b, more clearly shown in FIG. 2.

Figure 2:
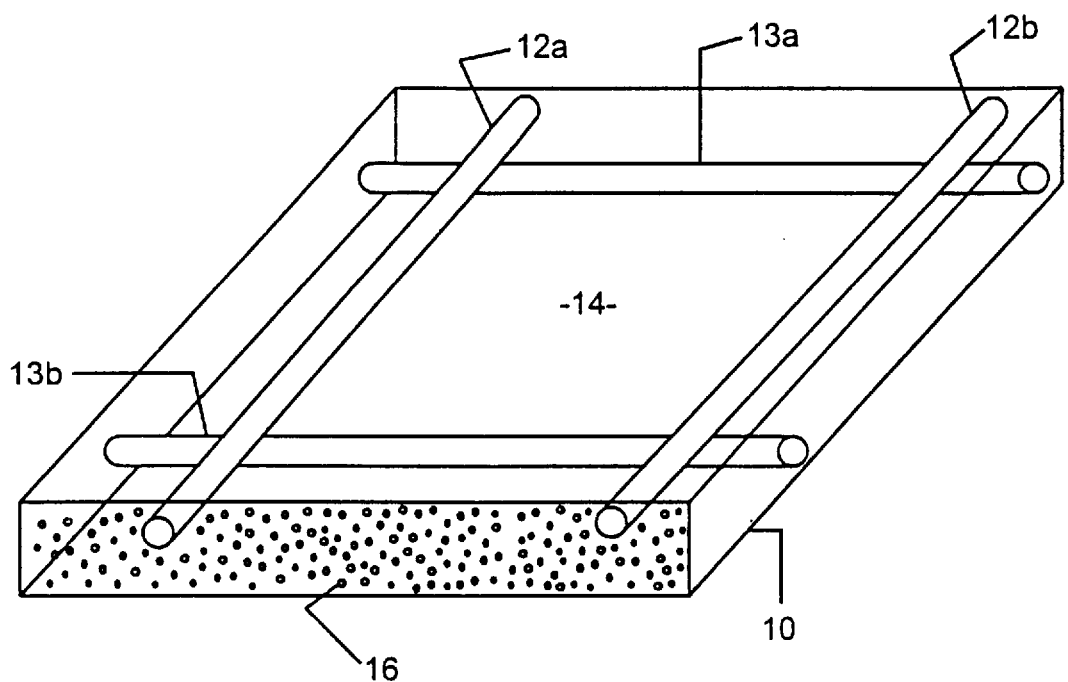
FIG. 2 depicts a RTV cell defined by the reinforcing fiber of the RTV film impregnated with microballoons.

Referring to FIG. 2, the film 10 is impregnated with microballoons 16, shown for clarity only on the front facing side, but are preferably uniformly distributed through the film 10. The fiber 12a, 12b, 13a and 13b, forming the cell 14, prevent the lateral movement of the film 10 during compression loading. Consequently, upon an application of a compressive pressure, the microballoon 16 begin to break emitting acoustical emissions. The film 10 may be square but can easily be cut to any size and shape.

Figure 3A:
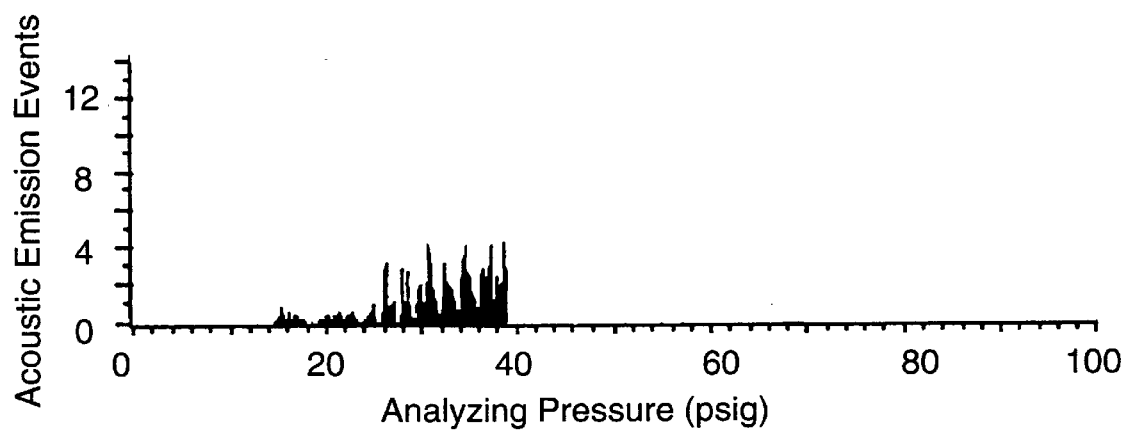
FIG. 3a depicts the acoustic emissions from a typical sample of microballoons when zero to forty psi pressure is applied.
Figure 3B:
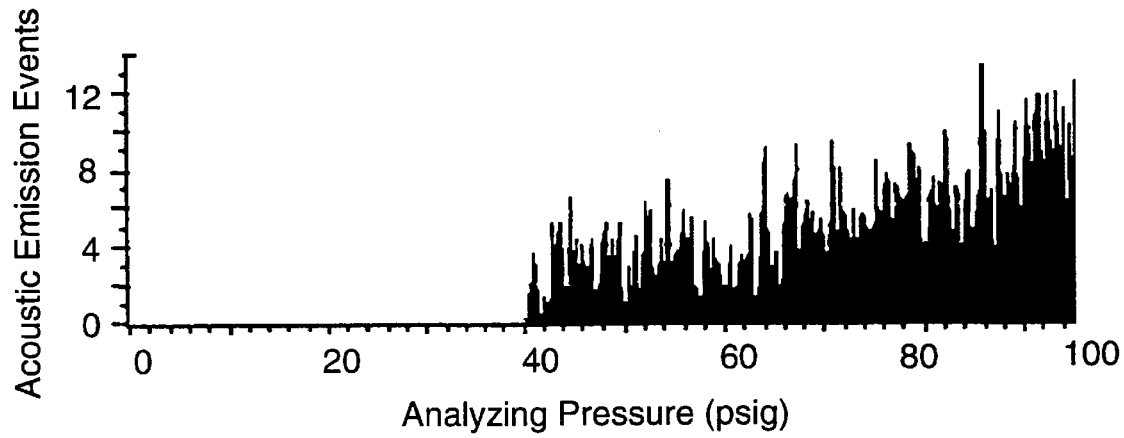
FIG. 3b is a histogram of the acoustic emissions from the same microballoon sample when zero to one hundred psi interrogating pressure is applied.

Referring to FIGS. 3a and 3b, histograms of the acoustical emissions demonstrate that the acoustic emission events can be used for pressure memory applications. FIG. 3a shows the acoustic emission events when an initially applied load pressure is initially increased from zero to forty psi. The load pressure is then relaxed back to zero. FIG. 3b shows the acoustic emission events when a subsequent interrogating pressure is subsequently increased from zero to one hundred psi. As indicated, the acoustic emissions during the application of the subsequent interrogating pressure begin to emit at about forty psi when the subsequent interrogating pressure reaches the maximum initially applied load pressure that is equivalent to the maximum applied initial compression stress. In this way, the subsequent interrogating pressure can be used to determine the maximum initially applied pressure.

The film functions as a sensor having memory of the maximum applied compression stress. Mechanically applied uniaxial compression can be initially applied to an initial stress level. The compressed film can then subsequently be tested by acoustic emission (AE) interrogation. During subsequent pressurization, no acoustic emissions are generated until the subsequent pressure becomes greater than the maximum of the initially applied pressure or the equivalent initial compression stress level. The Kaiser effect on the microballoons provides a maximum initial compression stress memory capability.

Figure 4:
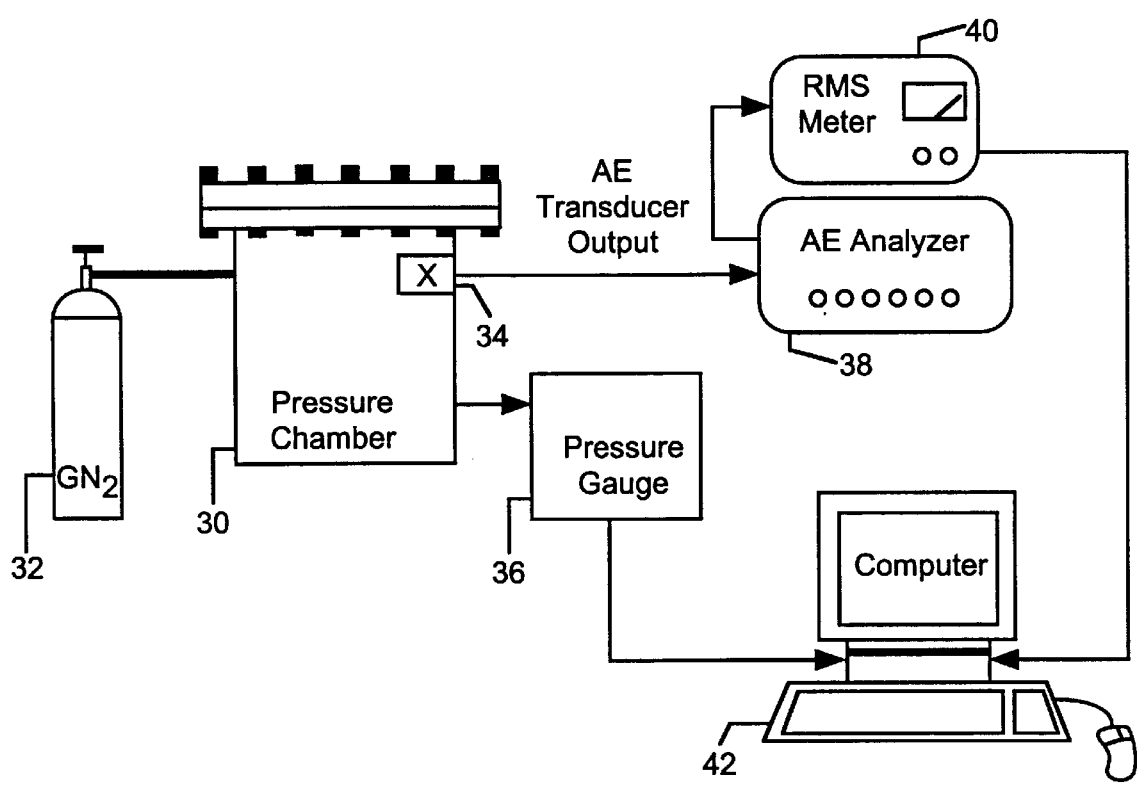
FIG. 4 is block diagram of a acoustic emissions acquisition system.

Referring to FIG. 4, an AE signal acquisition system can be used for applying a compressive pressure to the film. The system consists a pressure chamber 30 pressurized by a nitrogen gas source 32 as a pressurant. The chamber 30 has an acoustic transducer 34 for sensing the acoustic emissions. A pressure gauge 36 monitors the applied pressure. The transducer 34 preferably has a preamplifier, not shown, and provides an acoustic emission output that is communicated to an AE analyzer 38 used for receiving the AE signals. The system preferably uses a Physical Acoustic Corporation R15 transducer 34, a 1220 preamplifier, not shown, and a 3004 AE analyzer 38. The analyzer 38 is an AE analyzer that provides a convenient method for modifying the signal gain as well as providing some in-line filtering capability. An RMS voltage meter 40 measures of the magnitude of the AE signals. The output from the analyzer 38 is directed to the voltage meter 40, which is preferably an HP3400A RMS voltage meter. The RMS voltage meter 40 provides a convenient measure of the magnitude of the AE activity in the film. The chamber 30 can be pressurized at a controlled rate, for example, 0.4 psi/sec. The pressure chamber 30 is constructed to interrogate the microballoon RTV films. The film is placed on the R15 transducer 34 using a water-based couplant and the chamber 30 is then pressurized. The data acquisition system is controlled by a computer program, such as a Labview program, for capturing and displaying the RMS voltage output on a computer 42.

The sensor film enables precise initial compression stress maximum value determination. The response of the microballoon sensor is generally characterized as linear with pressure. The higher the applied pressure, the higher the RMS value of the AE signal, demonstrating a generally linear function. The preferred cross-ply reinforcement fibers 12 and 13 define a plurality of uniformly distributed confinement cells 14 for improved sensitivity and accuracy. The cross-ply reinforcement defines a matrix of rectangular cells 14. The effect of the fiber reinforcement tends to decrease the data scatter for increased linearity, improving sensitivity of the microballoon technique.

The preferred methods include fabricating the sensors, generation of initial mechanical stresses, and subsequent acoustic interrogation for determining the maximum compression registration during the initial application of pressure. Typically, the stress sensor will then be placed in the pressure chamber to determine the maximum compression that was experienced by the sensor when installed in a mechanical system. The 3M C15/250 glass microballoons are preferred. The preferred matrix is GE-RTV-11 with two parts silicone. Typically, 1–2 weight percent of microballoons of 15–30 percent by volume may be preferably used. The mixture of microballoons and RTV-11 can be cured at room temperature. The thickness of the cured RTV sheet may be typically 0.13 mm, and generally between 0.10 to 0.90 mm.

The carbon fiber-reinforced RTV with microballoons can be used as a test gasket to determine that amount of torque to be applied to a fastening means to achieve a desired compression stress upon the film. Measured applied torque can be recorded and correlated to determine initial compression stresses when the subsequently applied pressure is applied to determine the initial maximum stress. A torque means, which is any device that applies a load pressure and provides an indication, such as a torque indication, which correlates the torque to the amount of applied pressure. For example, a torque wrench is used to tighten a fastening member, such as a bolt extending between and screwing together two flat elements providing compression stress upon the film when used for example as a gasket between the two elements. The torque wrench provides an indication of the amount force-distance torque applied which is related to the amount of applied stress upon the film. During general manufacture, assembly personnel need to know how much torque to apply to achieve a desired compressive stress. The preferred method provide a means of correlating the torque indication to the determined initial pressure or compressive stress. By applying torque translated into compression stress and pressure and recording the torque indication, a subsequent interrogating pressure can be used to determine the initial pressure which correlates the initial compressive stress to that indicated torque. The correlation can be used for calibrating desired initial pressures or compressive stress to actually applied torque using for example, a look up table or a simple calibration scale.

The film is used to receive uniaxial compression which generates biaxial compression on the constrained microballoons. In general, the RTV matrix will stretch out laterally when the surface is compressed because of Poisson's effect. A lateral direction constraint of the fibers is needed to retard the lateral compression of the film to provide biaxial compression upon the microballoons. Carbon fibers are known to have high axial stiffness. By using carbon fibers in the RTV matrix, a high degree of lateral constraint can be achieved. Chopped fibers can be mixed and disposed randomly in orientation within the RTV, thus having a transversely isotropic property in the plane of the film. Continuously running fibers, on the other hand, will provide maximum constraint in the fiber running directions. When continuous fibers are used, the carbon fibers are wrapped on two pieces of glasses at orthogonal directions, respectively. Microballoon-filled RTV can then be poured between two pieces of glasses. The films are then compressed to the desired thin thickness and cured. The films function as RTV gaskets. The application of initial pressure corresponding to the maximum compression registration onto the stress sensor can be applied by a loading frame, not shown, to apply the compression.

The acoustic response of the films with cross-ply fiber reinforcement are more uniform than for the unreinforced films. Under uniaxial compressive stress, such as in a pressurized microballoon impregnated fiber reinforced RTV film, a correspondence between the actual initially applied maximum compressive stress and the subsequent applied interrogating pressure can be determined. The scaled correspondence may be for example one and a half, so that, a measured forty psi actual maximum compressive stress may correspond to a sixty psi interrogating pressure. The film pressure can be calibrated for accurate initial pressure determinations. If the film is not fiber reinforced, a meaningful correspondence can not be established thus preventing accurate calibrations and compressive stress determinations.

The stress sensor films uses microballoon impregnated reinforced RTV to determine the maximum compressive stress of the RTV. The microballoon-impregnated RTV with reinforcing fibers to constrain the RTV, induce a pseudo-hydrostatic pressure upon the microballoons. The microballoons, when embedded in RTV thin films, can provide an indication of the maximum applied compressive stress. The use of carbon fibers provide lateral constraints and increase the repeatability of the test data. The use of a loading frame would provide a more accurate comparison between the maximum applied compressive stress and the subsequently applied interrogation pressure. The microballoon-filled fiber reinforcement RTV sensors have potential applications in the measurement of highly loaded joints. Those skilled in the art can make enhancements, improvements and modifications to enhance the invention. However, those enhancements, improvements and modifications may nonetheless fall within the spirit and scope of the following claims.

What is claimed is:

1. A method of determining a maximum compressive stress applied to a microballoon impregnated fiber reinforced sensor film, the method comprises the steps of, applying an initial pressure upon the film to create initial compression stress in the film up to a maximum pressure corresponding to the maximum compressive stress causing a first portion of the microballoons to rupture generating acoustic emissions while the initial pressure is increased to the maximum pressure, applying an interrogating pressure from below the maximum pressure up to a subsequent pressure upon the film to create subsequent compression stress in the film causing a second portion of the microballoons to rupture generating acoustic emissions when the subsequent compression stress exceeds the maximum compressive stress, and determining the interrogating pressure value when the acoustic emissions from the second portion begin to occur, and determining the maximum compressive stress from the determined interrogating pressure value.

2. The method of claim 1 wherein the determining step further comprises the steps of, monitoring the interrogating pressure, monitoring for acoustic emissions during the application of the interrogating pressure, and recording the interrogating pressure value when the second portion of microballoons begin to emit acoustic emissions.

3. The method of claim 1 wherein the maximum compression stress determining step comprises the step of correlating the interrogating pressure value to the maximum compressive stress.

4. A method of determining the amount of force applied to initially compress two elements together, the method comprises the steps of, disposing between the two elements a microballoon impregnated fiber reinforced sensor gasket, applying the force upon the gasket to create a compression stress in the gasket up to a maximum compression stress causing a first portion of the microballoons to rupture generating acoustic emissions, applying an interrogating pressure from below the maximum pressure up to a subsequent pressure upon the gasket to create subsequent compression stress in the gasket causing a second portion of the microballoons to rupture generating acoustic emissions when the subsequent compression stress exceed the maximum compression stress, determining the maximum compressive stress from the value of the interrogating pressure when the second portion of microballoons begin to emit acoustic emissions, and correlating the interrogating pressure value to the amount of force.

5. A method of correlating a force value to a compression stress value, the method comprises the steps of, disposing between the two elements a microballoon impregnated fiber reinforced sensor gasket, applying a force for creating a compression stress up to a maximum compressive stress corresponding to a maximum pressure upon the gasket causing a first portion of the microballoons to rupture and to emit acoustic emissions, measuring the force value of the force at the maximum compression stress, applying an interrogating pressure from below the maximum pressure up to a subsequent pressure upon the film causing a second portion of the microballoons to rupture and to emit acoustic emissions, monitoring the acoustic emissions when applying the interrogating pressure, determining the interrogating pressure value when the second portion of microballoons begin to emit acoustic emissions, determining the compression stress value from the interrogating pressure value to correlate the compression stress value to the force value.

6. The method of claim 5 wherein the force corresponds to a torque, and the force value corresponds to a torque value.

* * * * *